United States Patent
Choi et al.

(10) Patent No.: US 10,541,797 B2
(45) Date of Patent: Jan. 21, 2020

(54) METHOD AND APPARATUS FOR CONTROLLING TRANSMISSION POWER IN TRANSMITTER OF WIRELESS COMMUNICATION SYSTEM

(71) Applicant: Samsung Electronics Co., Ltd., Suwon-si, Gyeonggi-do (KR)

(72) Inventors: Yonghae Choi, Seongnam-si (KR); Hanseok Kim, Seoul (KR); Seongyong Park, Seongnam-si (KR); Junsung Lee, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 14/862,852

(22) Filed: Sep. 23, 2015

(65) Prior Publication Data

US 2016/0088571 A1    Mar. 24, 2016

Related U.S. Application Data

(60) Provisional application No. 62/054,569, filed on Sep. 24, 2014.

(30) Foreign Application Priority Data

Sep. 1, 2015    (KR) ........................ 10-2015-0123779

(51) Int. Cl.
*H04L 5/00*    (2006.01)

(52) U.S. Cl.
CPC ................................ *H04L 5/0048* (2013.01)

(58) Field of Classification Search
None
See application file for complete search history.

(56) References Cited

U.S. PATENT DOCUMENTS

| | | | |
|---|---|---|---|
| 9,088,947 B2* | 7/2015 | Kang | H04W 52/0216 |
| 9,179,349 B2* | 11/2015 | Nagata | H04W 24/10 |
| 2007/0111667 A1* | 5/2007 | Kwon | H04L 25/0226 455/67.11 |
| 2007/0201423 A1* | 8/2007 | Laroia | H04W 40/244 370/345 |
| 2008/0207249 A1 | 8/2008 | Choi et al. | |
| 2009/0156247 A1 | 6/2009 | Claussen et al. | |
| 2010/0260059 A1* | 10/2010 | Zhang | H04W 52/327 370/252 |
| 2010/0323745 A1* | 12/2010 | Chen | H04W 52/244 455/522 |

(Continued)

FOREIGN PATENT DOCUMENTS

| | | | |
|---|---|---|---|
| KR | 10-2012-0018266 A | 3/2012 | |
| WO | WO 2013122433 A1 * | 8/2013 | H04W 52/325 |

(Continued)

*Primary Examiner* — Chi H Pham
*Assistant Examiner* — Vladislav Y Agureyev
(74) *Attorney, Agent, or Firm* — Jefferson IP Law, LLP

(57) ABSTRACT

A method and apparatus of controlling transmission power in a transmitter of a wireless communication system are provided. The method includes generating a first signal to be transmitted to a receiver, identifying whether user data is allocated to the generated first signal, determining transmission power based on a result of the determination, and transmitting a second signal to the receiver, based on the determined transmission power and the first signal.

16 Claims, 9 Drawing Sheets

(56) References Cited

U.S. PATENT DOCUMENTS

| | | | |
|---|---|---|---|
| 2012/0044845 A1* | 2/2012 | Lee | H04W 52/0206 370/311 |
| 2012/0098602 A1* | 4/2012 | Doi | H03F 1/0205 330/297 |
| 2012/0113920 A1* | 5/2012 | Cheng | H04W 52/325 370/329 |
| 2012/0188936 A1* | 7/2012 | Ji | H04L 5/005 370/315 |
| 2012/0289270 A1* | 11/2012 | Huang | H04W 52/242 455/509 |
| 2013/0003673 A1* | 1/2013 | Dinan | H04W 72/0406 370/329 |
| 2013/0034070 A1* | 2/2013 | Seo | H04B 7/155 370/329 |
| 2013/0051351 A1* | 2/2013 | Seo | H04J 11/0056 370/329 |
| 2013/0114498 A1* | 5/2013 | Park | H04W 4/06 370/312 |
| 2013/0194950 A1* | 8/2013 | Haghighat | H04W 24/02 370/252 |
| 2013/0322235 A1* | 12/2013 | Khoryaev | H04W 24/10 370/229 |
| 2013/0343268 A1 | 12/2013 | Wan et al. | |
| 2014/0016598 A1* | 1/2014 | Kwon | H04L 5/0023 370/329 |
| 2014/0099942 A1 | 4/2014 | Kim et al. | |
| 2014/0119311 A1* | 5/2014 | Weber | H04W 52/143 370/329 |
| 2014/0269597 A1* | 9/2014 | Park | H04J 11/005 370/329 |
| 2014/0274101 A1* | 9/2014 | Venkatesan | H04W 28/08 455/453 |
| 2014/0293881 A1* | 10/2014 | Khoshnevis | H04L 5/0048 370/329 |
| 2014/0307669 A1* | 10/2014 | Yang | H04W 52/146 370/329 |
| 2015/0043406 A1* | 2/2015 | Ko | H04W 52/325 370/311 |
| 2015/0156735 A1* | 6/2015 | Goto | H04W 52/54 455/522 |
| 2015/0172007 A1* | 6/2015 | Oketani | H04L 1/1861 370/329 |
| 2015/0237518 A1* | 8/2015 | Seo | H04W 24/10 455/452.1 |
| 2015/0333880 A1* | 11/2015 | Yi | H04L 5/001 370/329 |
| 2015/0358940 A1* | 12/2015 | Zhang | H04W 4/023 370/312 |
| 2015/0358977 A1* | 12/2015 | Seo | H04L 5/1469 455/452.1 |
| 2016/0021621 A1* | 1/2016 | Wu | H04W 52/244 370/311 |
| 2016/0112177 A1* | 4/2016 | Zheng | H04L 5/0051 370/330 |
| 2016/0241308 A1* | 8/2016 | Kim | H04L 5/0048 |

FOREIGN PATENT DOCUMENTS

| | | | | |
|---|---|---|---|---|
| WO | WO 2013138068 A1 * | 9/2013 | | H04W 52/244 |
| WO | WO-2013170911 A1 * | 11/2013 | | |
| WO | WO 2014088185 A1 * | 6/2014 | | H04L 5/0048 |
| WO | WO 2014137130 A1 * | 9/2014 | | H04L 5/1469 |

* cited by examiner

METHOD AND APPARATUS FOR CONTROLLING TRANSMISSION POWER IN TRANSMITTER OF WIRELESS COMMUNICATION SYSTEM

CROSS-REFERENCE TO RELATED APPLICATION(S)

This application claims the benefit under 35 U.S.C. § 119(e) of a U.S. Provisional application filed on Sep. 24, 2014 in the U.S. Patent and Trademark Office and assigned Ser. No. 62/054,569, and under 35 U.S.C. § 119(a) of a Korean patent application filed on Sep. 1, 2015 in the Korean Intellectual Property Office and assigned Serial number 10-2015-0123779, the entire disclosure of each of which is hereby incorporated by reference.

TECHNICAL FIELD

The present disclosure relates to a method of controlling transmission power in a transmitter of a wireless communication system, and an apparatus adapted to the method. More particularly, the present disclosure relates to a method and apparatus according to the present disclosure controls transmission power based on transmission signals, and thus increases the efficiency of power consumption.

BACKGROUND

In order to meet the increase in the demand for wireless data traffic after the commercialization of $4^{th}$ generation (4G) communication systems, considerable effort has been made to develop pre-$5^{th}$ generation (5G) communication systems or improved 5G communication systems. In order to achieve a high data transmission rate, 5G communication systems are being developed to be implemented in a band of extremely high frequency, or millimeter wave (mmWave), e.g., a band of 60 GHz. This is one reason why '5G communication systems' or 'pre-5G communication systems' are called 'beyond 4G network communication systems' or 'post long term evolution (LTE) systems.'

In order to reduce the occurrence of stray electric waves in a band of extremely high frequency energy and to increase the transmission distance of electric waves in 5G communication systems, various technologies are being explored, for example: beamforming, massive multiple-input and multiple-output (MIMO), full dimensional MIMO (FD-MIMO), array antennas, analog beam-forming, large scale antennas, etc. In order to improve system networks for 5G communication systems, various technologies have been developed, e.g., evolved small cell, advanced small cell, cloud radio access network (cloud RAN), ultra-dense network, device to device communication (D2D), wireless backhaul, moving network, cooperative communication, coordinated multi-points (CoMP), interference cancellation, etc. In addition, for 5G communication systems, other technologies have been developed, e.g., hybrid frequency-shift keying (FSK) and quadrature amplitude modulation (QAM) modulation (FQAM) and sliding window superposition coding (SWSC), as advanced coding modulation (ACM), filter bank multi carrier (FBMC), non-orthogonal multiple access (NOMA), sparse code multiple access (SCMA), etc.

The Internet has evolved from a human-based connection network, where humans create and consume information, to an Internet of things (IoT) where distributed configurations, such as objects, exchange information with each other to process the information. The technology related to the IoT is starting to be combined with, for example, a technology for processing big data through connection with a cloud server, and this is called an Internet of everything (IoE) technology. In order to manifest the IoT, various technical components are required, such as, a sensing technology, wired/wireless communication and network infra technology, a service interfacing technology, a security technology, etc. In recent years, a sensor network for connecting objects, machine to machine (M2M), machine type communication (MTC), etc. have been researched. Under the IoT environment, intelligent Internet Technology (IT) services may be provided to collect and analyze data obtained from objects connected to each other and thus to create new value. As existing IT technologies are fused and combined with various industries, the IoT may also be applied within various fields, such as: smart homes, smart buildings, smart cities, smart cars or connected cars, smart grids, health care, smart home appliances, high quality medical services, etc.

To this end, various attempts have been made to apply 5G communication systems to the IoT. For example, various technologies related to sensor networks, M2M, MTC, etc., have been implemented by beam-forming, MIMO, array antenna, etc., as 5G communication technology. The application of the cloud RAN as a big data processing technology described above may be an example of a hybrid of 5G technology and IoT technology.

In order to perform data transmission, LTE systems use a plurality of carriers to simultaneously transmit signals in a broad band, and may also separate user data and control information in order to transmit the separated result on the transmission time domain.

In order to achieve high speed data transmission of wireless channels in wireless systems, orthogonal frequency division multiple access (OFDMA) or single carrier-FDMA (SC-FDMA) has been researched.

Multiple Access allocates and manages data or control information according to users to time-frequency resources, so as to prevent overlapping between them, i.e., so as to achieve orthogonality, thereby distinguishing data or control information between respective users.

In order to provide high transmission rate wireless data service in mobile communication systems, one important factor is the ability to support scalable bandwidths. For example, LTE systems can support various bandwidths, such as 20, 15, 10, 5, 3, 1.4 MHz, etc.; while LTE-advanced (LTE-A) systems can provide services in a wide range of bandwidths, up to 100 MHz, via LTE carrier aggregation.

Service providers can select one of a plurality of bandwidths via which to provide their services. There are various types of user equipment (UE) devices that can support bandwidths from a minimum of 1.4 MHz to a maximum of 20 MHz.

In general, scheduling information for data transmitted on respectively configured carriers is downlink control information (DCI) to be transmitted to UE devices. DCI may define various formats. That is, DCI may apply a DCI format determined according to whether: scheduling information is related to uplink data or downlink data; DCI is compact DCI; spatial multiplexing using multiple antennas is applied; DCI is DCI for power control; etc., and may be accordingly managed. For example, the DCI may include the following information items, and then may be transmitted.

Resource allocation type 0/1 flag: This is used to notify UE whether a resource allocation method is type 0 or type 1. Type 0 allocates resources in a unit of resource block group (RBG) by applying a bitmap. In LTE and LTE-A systems, the basic unit (default unit) for scheduling is a resource block (RB) represented by time and frequency domain resources, and RBG includes a plurality of RBs, serving as a basic unit (default unit) for scheduling in type 0. Type 1 allows a particular RB to be allocated in RBG.

Resource block assignment: This may notify UE of RBs allocated to data transmission. Resources to be represented are determined according to a system bandwidth and a resource allocating method.

Modulation and coding scheme: This notifies UE of the modulation and coding rate used for data transmission.

Hybrid automatic repeat request (HARQ) process number: This notifies UE of a processor number of HARQ.

New data indicator: It notifies UE that HARQ is transmitted from the first time or re-transmitted.

Redundancy version: This notifies UE of the redundancy version of HARQ.

Transmission power control (TPC) command for physical uplink control channel (PUCCH): This notifies UE of power control command for PUCCH.

The DCI, which can notify UE of the information items described above, is processed by channel coding and modulation, and the processed result is transmitted to the UE through physical downlink control channel (PDCCH).

User data may also be transmitted to the UE through physical downlink shared channel (PDSCH).

When there is data to be transmitted to UE through PDSCH, the transmitter of a base station needs enough power to transmit the data. However, when there is no data to be transmitted to UE, or when there is no signal in an interval of time during which PDSCH is transmitted, except for signals such as a reference signal and a synchronization signal, transmission of the signals with sufficient power may cause the waste of transmission power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus that control transmission power according to a condition as to whether a transmitter of a wireless communication system performs transmission of user data, and thus increases the efficiency of use transmission power.

Another aspect of the present disclosure is to provide a method and apparatus that determine whether to control transmission power considering a condition as to whether user data is transmitted and a type of transmission signal, set transmission power according to the type of transmission signal, and control the timing to control the transmission power.

In accordance with an aspect of the present disclosure, a method of transmitting a signal by a transmitter of a mobile communication system is provided. The method includes generating a first signal to be transmitted to a receiver, identifying whether user data is allocated to the generated first signal, determining transmission power based on a result of the identification, and transmitting a second signal to the receiver, based on the determined transmission power and the first signal.

In accordance with another aspect of the present disclosure, a transmitter of a mobile communication system is provided. The transmitter includes a transceiver configured to transmit and receive a signal, and a controller configured to control the transceiver, to generate a first signal to be transmitted to a receiver, to identify whether user data is allocated to the generated first signal, to determine transmission power based on a result of the identification, and to transmit a second to the receiver, based on the set transmission power and the first signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
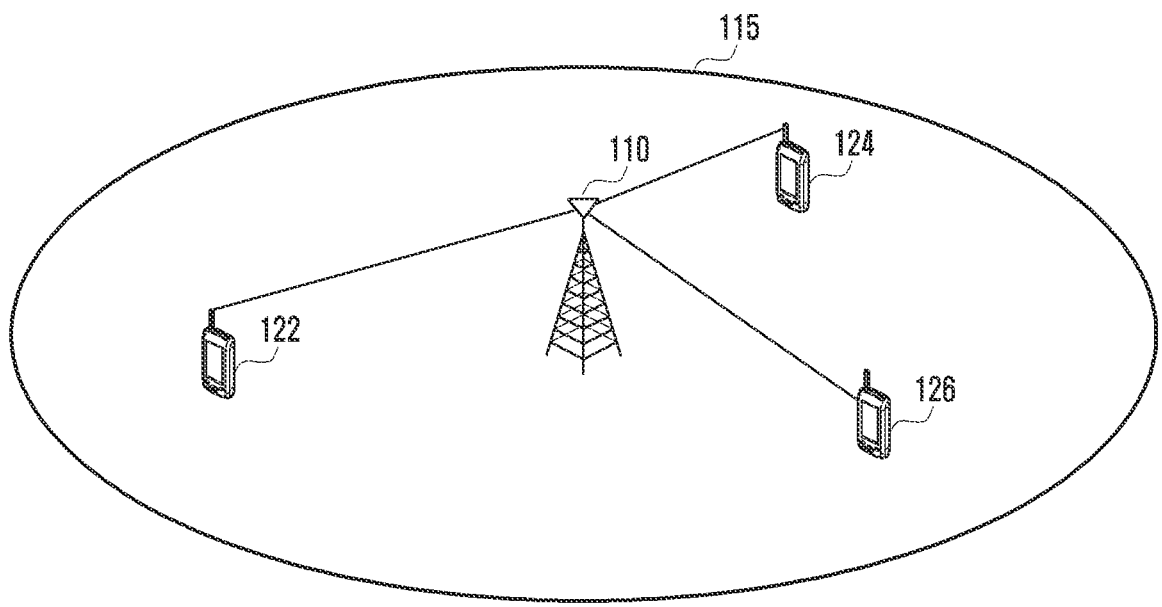
FIG. 1 is a schematic diagram showing a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the drawings represent an embodiment of the disclosure, the drawings are not necessarily to scale and certain features may be exaggerated or omitted in order to better illustrate and explain the disclosure. The same reference numbers are used throughout the drawings to refer to the same or similar parts.

The features and advantages of the disclosure and the method to achieve them will become more apparent from the following detailed description in conjunction with the accompanying drawings. It will be easily appreciated to those skilled in the art that various modifications, additions and substitutions are possible from the various embodiments of the disclosure that are illustrated and described in detail in the following description, and the scope of the disclosure should not be limited to the following embodiments. The various embodiments of the present disclosure are provided such that those skilled in the art completely understand the disclosure. It should be understood that the disclosure may include all modifications and/or equivalents and/or substations included in the idea and technical scope of the present disclosure. In the drawings, the same or similar elements are denoted by the same reference numbers even though they are depicted in different drawings.

In addition, it should be understood that the process and the operations of the present disclosure, described above, can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flow chart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow chart therein. In addition, since the computer programming instructions can also be installed to computers or data processing equipment that can be programmed, they can create processes that perform a series of operations therein, described in the blocks of the flow chart therein.

The blocks of the flow chart refer to part of codes, segments or modules that include one or more executable instructions to perform one or more logic functions. It should be noted that the functions described in the blocks of the flow chart may be performed in a different order from the various embodiments described above. For example, the functions described in two adjacent blocks may be performed at the same time or in reverse order.

In the various embodiments, the terminology, component '~unit,' refers to a software element or a hardware element such as a permanent global positioning system (GPS) geodetic array (PGGA), an application-specific integrated circuit (ASIC), etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more central processing units (CPUs) in devices or security multicards.

FIG. 1 is a schematic diagram showing a wireless communication system according to an embodiment of the present disclosure.

Referring to FIG. 1, a base station (e.g., an evolved node-B (eNB)) 110 may form a cell 115 in the wireless communication system. One or more user equipment devices (UEs) 122, 124, and 126 in the cell 115 may transmit/receive signals to/from the base station 110.

The base station 110 may transmit scheduling information to at least one of the UEs 122, 124, and 126 through control signals, and may transmit signals to the respective UEs 122, 124, and 126 through downlink shared channels according to the scheduling information. Although there is no user data, the downlink control information may be transmitted to UEs 122, 124, and 126.

In an embodiment, there may be an interval of time (or time interval) during which user data is not transmitted to UEs 122, 124, and 126 in the cell. That is, when there is a time interval during which user data is not transmitted, signals for user data are not transmitted, but at least one of the following may be transmitted: a reference signal for channel measurement, physical broadcast channel (PBCH) for broadcast transmission, and primary synchronization signal (PSS) and/or secondary synchronization signal (SSS) for making synchronization, in a time interval during which physical downlink shared channel (PDSCH) is transmitted. Signals required for transmission may be easily transmitted with lower power in a time interval during which user data is not transmitted to PDSCH than in a time interval during which user data is transmitted.

As the transmission power of a transmitter of a base station is controlled in a time interval during which user data is not transmitted, the waste of transmission power can be prevented. Although the power control method according to the various embodiments is described based on a base station, it should be understood that the present disclosure is not limited to the embodiments, and may also be applied to various transmitters that may correspond to the embodiments. In addition, the respective devices, described in the embodiments, may selectively perform the operations, omit part of the operations if necessary, or perform operations similar to the omitted operations.

There are two types of methods used to increase the efficiency of power consumption in transmission apparatus. A first type of method is to increase the efficiency of power consumption of the radio unit (RU) by maximizing the efficiency of the power amplifier (PA) from the maximum power viewpoint, for example, a Doherty Amplifier. A second type of method is to increase the efficiency of power consumption of an RU by controlling the bias of the PA according to the states of traffic transmitted by a transmission apparatus.

In general, traffic transmitted/received in a communication system may be created, and may be less than a maximum traffic. More specifically, traffic has an average busy hour less than or equal to 40% of the maximum traffic and an average idle hour less than or equal to 10% of the maximum traffic. Therefore, when transmission/reception of signals is performed with the maximum transmission power of PA, set according to the maximum traffic, the efficiency of power consumption may be decreased. In general, since the efficiency of the PA is low at a low load, the method of maximizing the efficiency of PA from the maximum power viewpoint has a limit to reduce the power consumption.

Therefore, a hybrid attempt may be considered that maximizes the efficiency of PA from the maximum power viewpoint, controls the bias value of the PA according to states of traffic transmitted by the transmission apparatus, and simultaneously applies the power consumption efficiency of RU.

In an embodiment, the method of controlling a PA according to states of traffic transmitted by a transmission apparatus to increase the transmission efficiency may include at least two embodiments. As a first embodiment, the approach is an envelope tracking (ET) that tracks the envelope of RF signals for traffic varying in real-time and alters the bias of the PA, thereby increasing the power efficiency of the RU. As a second embodiment, the approach controls PA drain bias voltage of the RU, in a time interval with low physical resource block (PRB) usage, by using traffic statistics of a period of a few minutes (e.g., 5 minutes) in communication systems, thereby increasing the power efficiency of the RU. The ET is disadvantageous because it is difficult to design a power modulator for ET for long term evolution (LTE) signals with a bandwidth of over 20 MHz, e.g., a power modulator that has high efficiency in a high power PA of over 20 Watts, and the precision of the ET is reduced when transmission (Tx) power is low (i.e., low traffic condition), which causes the efficiency of power consumption to decrease. In contrast, when the PA drain bias is controlled by using statistical information about communication systems for a certain period of time, a restriction occurs on resources available for a period of time during which the PA bias control function is running.

Therefore, it is necessary to actively detect information about traffic and to perform the power control. As an additional embodiment, a transmission apparatus of a communication system determines the extent of transmission traffic as a particular transmission unit (e.g., subframe) and controls a PA (e.g., the drain bias) according to the determined extent of traffic, thereby increasing the transmission efficiency. More specifically, a transmission apparatus monitors scheduling information about transmission signals, and controls a PA based on the monitored scheduling information, thereby increasing the communication efficiency.

More specifically, the transmission apparatus of an embodiment of the present disclosure sets a drain bias of a PA as a proper level of voltage to transmit basic signals (e.g., a reference signal, a synchronization signal, common control channel-related signals) with respect to a transmission unit (subframe) without user traffic, thereby increasing the efficiency of a RU. In order to determine a transmission interval without user traffic, the transmission apparatus detects the extent of transmitted, user traffic by using a method of receiving scheduling information or by analyzing transmitted waveforms, and may control a PA based on the detected, extent of user traffic.

An LTE system of an embodiment performs transmission of signals, by applying a drain voltage of the PA that may perform transmission of a reference signal, PBCH, synchronization signal, and control channel, in a subframe without user traffic, thereby increasing the efficiency in the transmission apparatus. Additionally, when an LTE system measures PRB usage of the respective cells of a base station, it may detect a quite amount of user traffic that has not been transmitted. According to statistics a day at actual workplaces, the situation where the user traffic is not allocated occurs on average 80%. When signals corresponding to a subframe without real user data are transmitted, the output transferred to the antenna through the PA is to transmit physical control format indicator channel (PCFICH) representing an area of a control symbol, physical downlink control channel (PDCCH) for transmitting downlink control information (DCI) for UL traffic, physical HARQ indicator channel (PHICH) for physical uplink shared channel (PUSCH), cell reference signal (CRS)/PBCH/PSS/SSS that are periodically created, etc. The PA may also be operated at a PA drain bias level less than that for the max power of an RU.

The method of controlling transmission power based on the active traffic information detection has an advantage in that it can reduce power consumption, by controlling a PA in real-time, in a transmission interval where user traffic is not transmitted.

When an LTE system according to an embodiment of the present disclosure does not have user traffic, relative PA power to PA Max Power by subframe patterns for CRS/PBCH/PSS/SSS may be defined as the following table 1. Numerals in the table 1 are examples, so they may vary within a certain range when they are applied to a real system.

TABLE 1

| Criterion: Max DL PWR | LTE channel BW | RS Only | SS | PBCH | RS + PBCH |
|---|---|---|---|---|---|
| When CRS power is ⅙ of Max Power | 5 MHz | 17% | 21% | 24% | 37% |
| | 10 MHz | 17% | 10% | 12% | 27% |
| | 15 MHz | 17% | 7% | 8% | 23% |
| | 20 MHz | 17% | 5% | 6% | 22% |
| When CRS power is ⅓ of Max Power | 5 MHz | 33% | 21% | 24% | 49% |
| | 10 MHz | 33% | 10% | 12% | 41% |
| | 15 MHz | 33% | 7% | 8% | 39% |
| | 20 MHz | 33% | 5% | 6% | 37% |

Table 1 describes relative PA Power to PA Max Power by Symbol patterns in an LTE system of an embodiment.

In the embodiment, PA drain bias is also set to four levels, 25%, 33%, 50%, and 100%. In the case of no user traffic, the bias is altered to the efficient PA drain bias value, thereby increasing the efficiency of the PA. Accordingly, PA power levels and PA drain bias levels are described in the following table.

TABLE 2

| Criterion: Max DL PWR | LTE channel BW | RS Only | SS | PBCH + SS |
|---|---|---|---|---|
| When CRS power is 1/6 of Max Power | 5 MHz | 25% | 25% | 50% |
| | 10 MHz | 25% | 25% | 33% |
| | 15 MHz | 25% | 25% | 25% |
| | 20 MHz | 25% | 25% | 25% |
| When CRS power is 1/3 of Max Power | 5 MHz | 33% | 33% | 50% |
| | 10 MHz | 33% | 33% | 50% |
| | 15 MHz | 33% | 33% | 50% |
| | 20 MHz | 33% | 33% | 50% |

Table 2 describes relative PA Power to PA Max Power by Symbol patterns in an LTE system according to an embodiment of the present disclosure. More specifically, approximations of values corresponding to respective states are determined, and the PA drain bias may be adjusted based on the approximations. When the PA drain bias is controlled in various modes, the control efficiency may be reduced. To resolve this problem, an approximation of a power level that is frequently used is determined and is then set as a power value for the control, thereby increasing the control efficiency. More specifically, when CRS power is 1/6 of the max power, a subframe transmitting only a reference signal (RS) may perform transmission at 17% of the maximum power; however, since the most approximate value is 25% of the maximum power, the transmission power may be controlled to meet the approximate value.

In an embodiment, a drain bias voltage level may be adjusted to control transmission power, and the corresponding values are described in the following table 3.

TABLE 3

| Criterion: Max Drain Voltage ($V_{D\_M}$) | LTE channel BW | RS Only subframe | SS Subframe | PBCH + SS subframe |
|---|---|---|---|---|
| When CRS power is 1/6 of Max Power | 5 MHz | $V_{D\_M}/4 \sim V_{D\_M}/2$ | $V_{D\_M}/4 \sim V_{D\_M}/2$ | $V_{D\_M}/2 \sim V_{D\_M}*3/4$ |
| | 10 MHz | $V_{D\_M}/4 \sim V_{D\_M}/2$ | $V_{D\_M}/4 \sim V_{D\_M}/2$ | $V_{D\_M}/3 \sim V_{D\_M}*2/3$ |
| | 15 MHz | $V_{D\_M}/4 \sim V_{D\_M}/2$ | $V_{D\_M}/4 \sim V_{D\_M}/2$ | $V_{D\_M}/4 \sim V_{D\_M}/2$ |
| | 20 MHz | $V_{D\_M}/4 \sim V_{D\_M}/2$ | $V_{D\_M}/4 \sim V_{D\_M}/2$ | $V_{D\_M}/4 \sim V_{D\_M}/2$ |
| When CRS power is 1/3 of Max Power | 5 MHz | $V_{D\_M}/3 \sim V_{D\_M}*2/3$ | $V_{D\_M}/3 \sim V_{D\_M}*2/3$ | $V_{D\_M}/2 \sim V_{D\_M}*3/4$ |
| | 10 MHz | $V_{D\_M}/3 \sim V_{D\_M}*2/3$ | $V_{D\_M}/3 \sim V_{D\_M}*2/3$ | $V_{D\_M}/2 \sim V_{D\_M}*3/4$ |
| | 15 MHz | $V_{D\_M}/3 \sim V_{D\_M}*2/3$ | $V_{D\_M}/3 \sim V_{D\_M}*2/3$ | $V_{D\_M}/2 \sim V_{D\_M}*3/4$ |
| | 20 MHz | $V_{D\_M}/3 \sim V_{D\_M}*2/3$ | $V_{D\_M}/3 \sim V_{D\_M}*2/3$ | $V_{D\_M}/2 \sim V_{D\_M}*3/4$ |

As described in table 3, the drain bias voltage level of a PA is controlled according to signals of transmitted subframes to perform transmission of signals. It should be understood that the numerals for values described in the table 3 are examples but not limited thereto. For example, the present disclosure may also be implemented with the approximate values of the numerals in the table 3.

Figure 2:
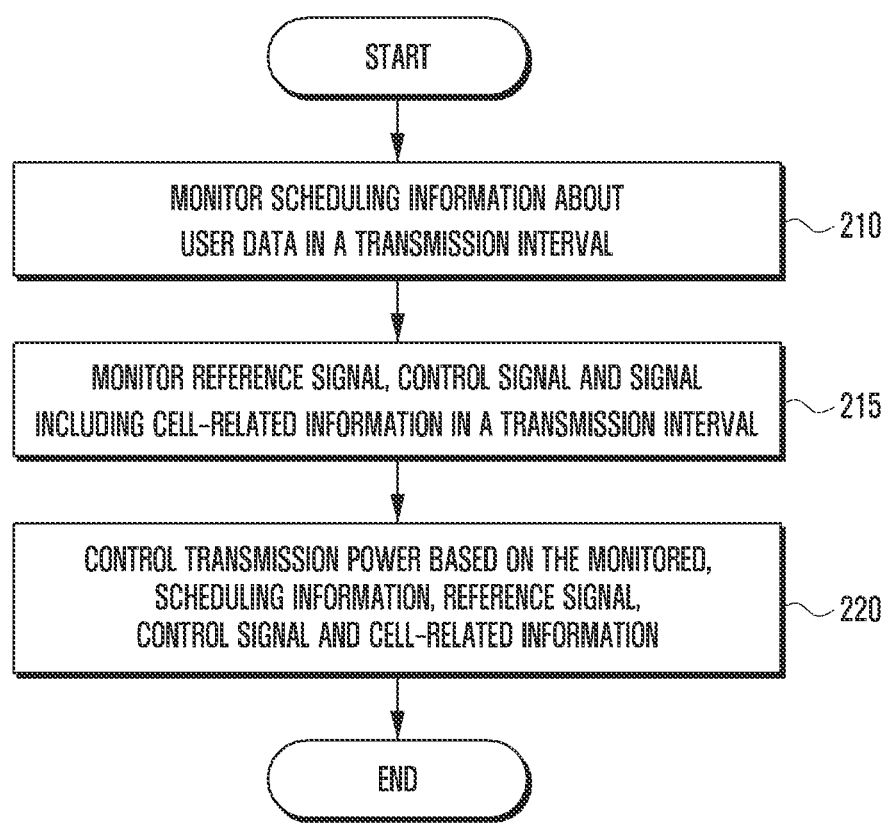
FIG. 2 is a flow diagram that describes a method of controlling transmission power in a transmitter according to a first embodiment of the present disclosure.

FIG. 2 is a flow diagram that describes a method of controlling transmission power in a transmitter according to a first embodiment of the present disclosure.

Referring to FIG. 2, the transmitter according to the embodiment may transmit signals to the receiver. The transmission signals may include control information, data and cell-related information. The control information may be related to signals for controlling the receiver, such as scheduling information, or signals used for transmission of data. The transmitter may also transmit signals including the data, a reference signal, and signals including cell-related information. The bandwidth for transmission of the information may be the identical bandwidth or separated bandwidths.

The transmitter may monitor scheduling information about data transmitted to a receiver in a particular transmission interval in operation 210. According to an embodiment, the transmitter may monitor whether user data is transmitted in a particular subframe. More specifically, the transmitter analyzes scheduling information and a source signal to be transmitted to a receiver to monitor information about the user data. In the embodiment, the source signal may include signals that the PA will amplify and then transmit the amplified signals. In addition, the data scheduling information may include the time-variation of signals containing data transmitted in a particular transmission interval.

The transmitter may include at least one of the following: a reference signal, a control signal, and a signal including cell-related information, which is transmitted to the receiver in a particular transmission interval in operation 215. More specifically, when user data is transmitted in a particular transmission interval, the monitored signal may include the user data in transmission signals. When user data is not transmitted in a particular transmission interval, the monitored signals may include signals transmitted irrespective of a condition as to whether user data is transmitted. In addition, monitoring the transmission signals may include a transmission time of the signals in a particular time interval. More specifically, when the particular time interval corresponds to a particular subframe, the control signal may be transmitted by three or four symbols in the initial part of the particular subframe. The reference signal and a signal containing cell-related information may detect the location of symbols transmitting the signals, so that the corresponding signal can monitor the transmitted symbol.

The transmitter may control transmission power, based on the types of signals monitored in operations 210 and 215, in operation 220. More specifically, the transmitter may control transmission power in the PA, based on the types and amount of signals to be transmitted in the particular transmission interval. When a transmission signal needs a high level of transmission power, the transmitter controls transmission power to be high in a corresponding interval. On the other hand, when a transmission signal does not need a high level of transmission power, the transmitter controls transmission power to meet a corresponding level. As described above, the transmitter may control transmission power according to the reference signal transmitted along with the monitored scheduling information, the control signal, and a signal containing cell-related information. In the embodiment, 'monitoring the signals transmitted' may also be called 'monitoring a subframe pattern.' The transmitter may detect a pattern of particular subframes and may control transmission power according to the pattern of signals transmitted. As described above, the transmitter controls power of the PA corresponding to the transmission signals, thereby preventing electric power from being unnecessarily wasted.

Although the embodiment is described in such a way to control transmission power based on a determination as to whether user data is scheduled, it should be understood that the present disclosure is not limited thereto. In other embodiments, transmission power may also be controlled based on a determination as to whether particular data is transmitted.

Figure 3:
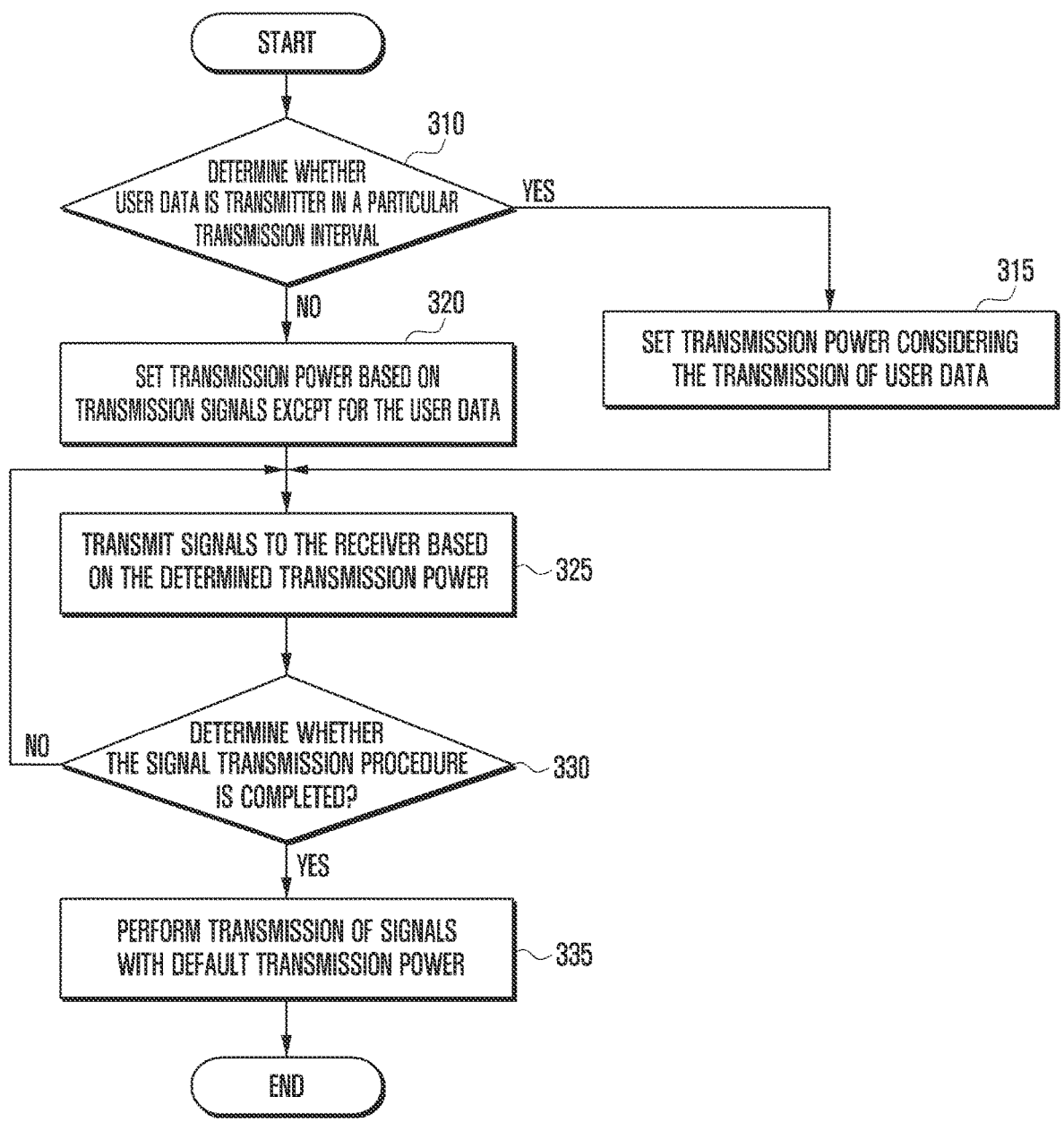
FIG. 3 is a flow diagram that describes a method of controlling transmission power in a transmitter according to a second embodiment of the present disclosure.

FIG. 3 is a flow diagram that describes a method of controlling transmission power in a transmitter according to a second embodiment of the present disclosure.

Referring to FIG. 3, the transmitter may control transmission power based on scheduling information. More specifically, the transmitter may determine whether user data is transmitted in a particular transmission interval, based on scheduling information, set transmission power based on the determination, and perform transmission of signals with the set transmission power.

When the transmission procedure is terminated in the particular transmission interval, the transmitter may transmit signals with default transmission power. More specifically, a particular transmission interval may be set based on the ascertainment that user data is transmitted.

The transmitter may determine whether user data is transmitted in a particular transmission interval, based on scheduling information, in operation 310. According to embodiments, the transmitter may also set a particular interval according to a condition as to whether a transmission interval is for user data.

The scheduling information may be created in the controller of the transmitter. When downlink data transmission is performed in a particular interval, the transmitter may also monitor a transmission pattern of signals containing downlink data, based on the scheduling information.

When the transmitter ascertains that user data is transmitted in a particular transmission interval in operation 310, it may set transmission power considering the transmission of user data in operation 315. More specifically, the transmitter may supply the PA with electric power required for the transmission of user data. The transmitter may also determine a transmission pattern of user data to control transmission power based on the determined transmission pattern.

On the other hand, when the transmitter ascertains that user data is not transmitted in a particular transmission interval in operation 310, it may set transmission power based on a signal transmitted except for the user data in operation 320. The signal transmitted except for user data may include at least one of the following: a reference signal, a synchronization signal, a signal including control information and a signal for transmitting cell information. In addition, the transmitter may also determine a pattern of signals that are transmitted when user data is not transmitted in operation 320. The transmitter may set transmission power corresponding to the determined transmission pattern of signals.

The transmitter may transmit signals to the receiver based on the determined transmission power in operation 325. The determined transmission power may adaptively vary according to signals transmitted in the particular transmission interval. More specifically, the transmission power value may be determined according to the pattern of signals transmitted in the particular transmission interval.

The transmitter may determine whether the signal transmission procedure is completed in the particular transmission interval in operation 330. When the transmitter ascertains that the signal transmission procedure has not been completed in operation 330, it returns to and proceeds with operation 325. On the other hand, when the transmitter ascertains that the signal transmission procedure has been completed in operation 330, it may perform transmission of signals with default transmission power in operation 335. The default transmission power may vary according to transmission states and also set to different values according to the states of the transmitter.

Figure 4:
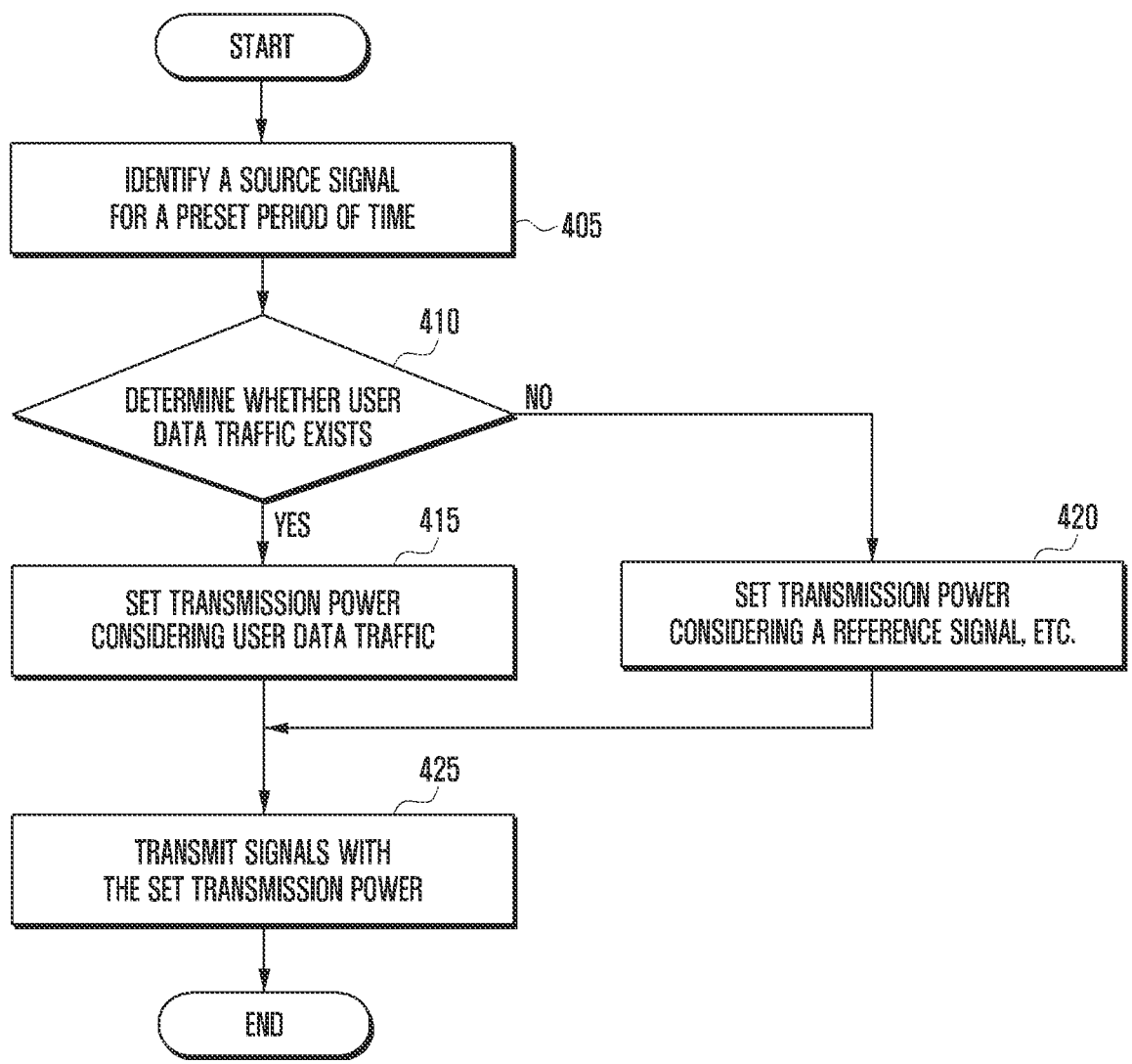
FIG. 4 is a flow diagram that describes a method of controlling transmission power in a transmitter according to a third embodiment of the present disclosure.

FIG. 4 is a flow diagram that describes a method of controlling transmission power in a transmitter according to a third embodiment of the present disclosure.

Referring to FIG. 4, the transmitter of the embodiment may identify a source signal that is transmitted and may control transmission power based on information obtained from the source signal. More specifically, the transmitter may obtain information related to allocation of user data from a source signal, determine whether a signal for transmission of user data is transmitted, based on the obtained information, and control transmission power based on the determination. According to an embodiment, when control information is transmitted through a particular symbol of a subframe in an LTE system, the transmitter may determine whether user data is allocated and may control transmission power based on the determination, considering a condition as to whether user data is transmitted. The transmitter may also analyze a waveform of a source signal to control transmission power based on the analyzed waveform.

The transmitter may identify a source signal for a preset period of time in operation 405. In the embodiment, the source signal may include information that is input to the PA and then transmitted to a receiver. The preset period of time may vary according to types of transmission signals. More specifically, when a condition as to whether to transmit user data is ascertained in an area where control information is transmitted, the preset period of time may be determined based on the area where the control information is transmitted.

The transmitter may determine whether a signal for transmission of user data exists, based on the ascertainment in operation 410. A condition as to whether user traffic exists may be determined according to a condition as to whether to identify the source signal.

When ascertaining that user traffic exists in operation 410, the transmitter may set transmission power to transmit user data traffic in operation 415. The set transmission power value or pattern may also be determined based on the ascertainment result of operation 405.

On the other hand, when ascertaining that user traffic does not exist in operation 410, the transmitter may set transmission power for transmission of a reference signal, etc., in operation 420. The set transmission power value or pattern may also be determined based on the ascertainment result of operation 405.

The transmitter may transmit signals with the set transmission power in operation 425.

As describe above, the transmitter identifies a source signal and controls transmission power based on the identified source signal. The transmitter may set transmission power by analyzing the source signal transmitted without receiving scheduling information, thereby reducing the complexity of the transmitter design.

Figure 5:
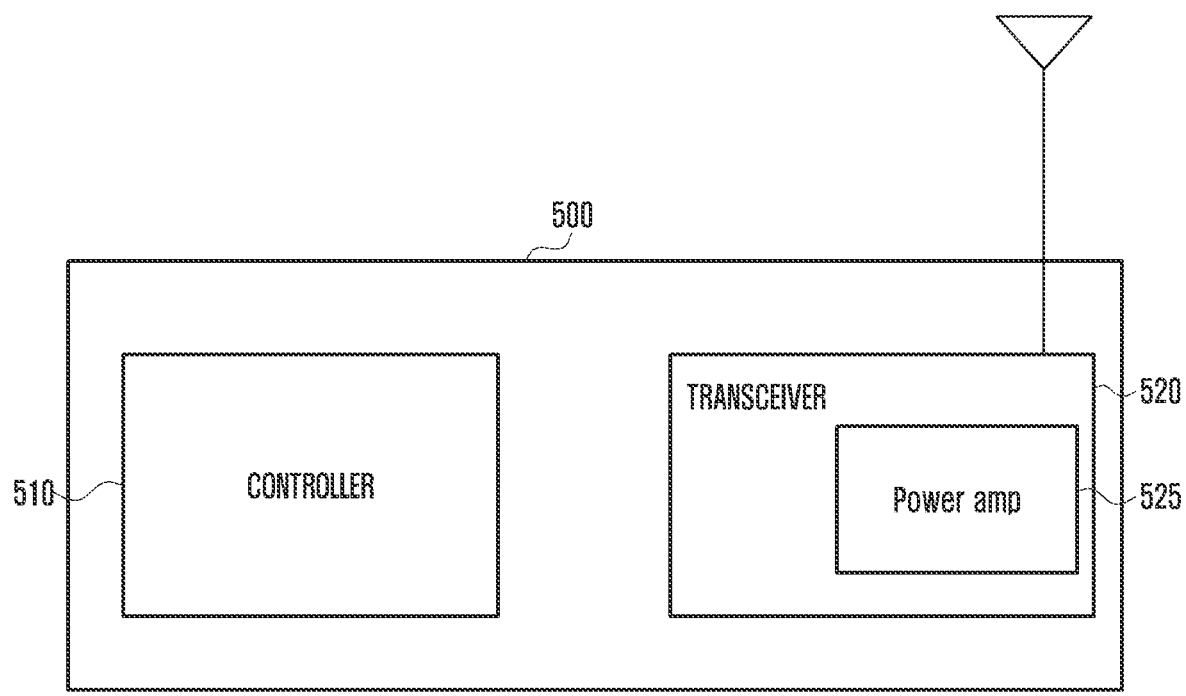
FIG. 5 is a schematic diagram showing a transmitter for performing power control according to an embodiment of the present disclosure.

FIG. 5 is a schematic diagram showing a transmitter for performing power control according to an embodiment of the present disclosure.

Referring to FIG. 5, the transmitter 500 of the embodiment may include a controller 510 and a transceiver 520.

The controller 510 may control the entire operation of the transmitter 500. More specifically, the controller 510 may control the operations of the transmitter 500 in the embodiment. The controller 510 may determine transmission signals and may control power of the signals transmitted through the transceiver 520.

The transceiver 520 may perform transmission/reception of signals according to the control of the controller 510. The transceiver 520 may include a PA 525. The PA 525 may amplify a source signal to be transmitted so that it can be transmitted over a wireless channel. Controlling transmission power may include a process of adjusting a drain bias voltage level of the PA. Therefore, power of transmission signals may be controlled. As the transmission power is adjusted, power consumption may vary.

In addition, the embodiment may also include a receiver for receiving signals from the transmitter. The receiver may include a controller for controlling the operations and a transceiver for receiving signals from the transmitter.

Figure 6:
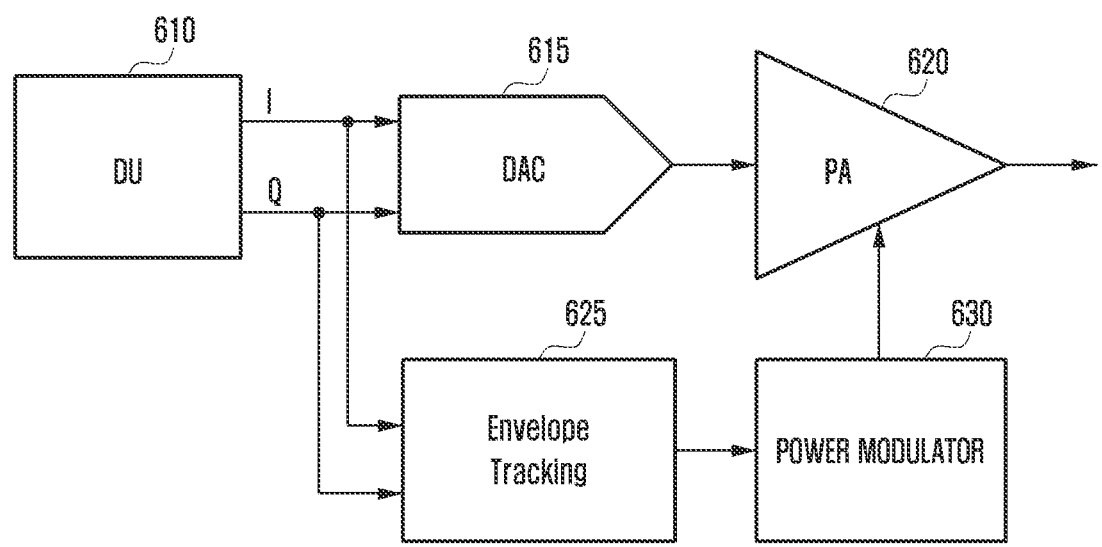
FIG. 6 is a schematic diagram showing a transmitter for controlling transmission power, based on the wave tracking, according to an embodiment of the present disclosure.

FIG. 6 is a schematic diagram showing a transmitter for controlling transmission power, based on wave tracking, according to an embodiment of the present disclosure.

Referring to FIG. 6, the transmitter of the embodiment may include at least one of the following: digital unit (DU) 610, digital to analog converter (DAC) 615, PA 620, ET unit 625, and power modulator 630.

The DU 610 may create a source signal that will be transmitted by the transmitter. The DU 610 may transfer the source signal in the format of an in-phase (I)/quadrature (Q) (I/Q) signal to the DAC 615. The DU 610 may also transfer the I/Q signal to the ET 625.

The DAC 615 may convert the digital I/O signal into an analog signal to be transmitted through a wireless channel.

The ET 625 may determine power required for transmitting a source signal through a wireless channel, based on the waveform of the received, I/Q signal, and may control the power modulator 630, based on the determined power, thereby controlling power supplied to the PA 620. This may be performed by controlling the drain bias voltage supplied to the PA 620. In the embodiment, power may be calculated based on a signal transferred from the DU 610, and thus transmission power may be adaptively adjusted according to the supplied power.

The PA 620 may amplify a source signal converted in the analog form and transmit the amplified source signal through a wireless channel, and may adjust the transmission power according to the drain bias voltage supplied through the power modulator 630.

Figure 7:
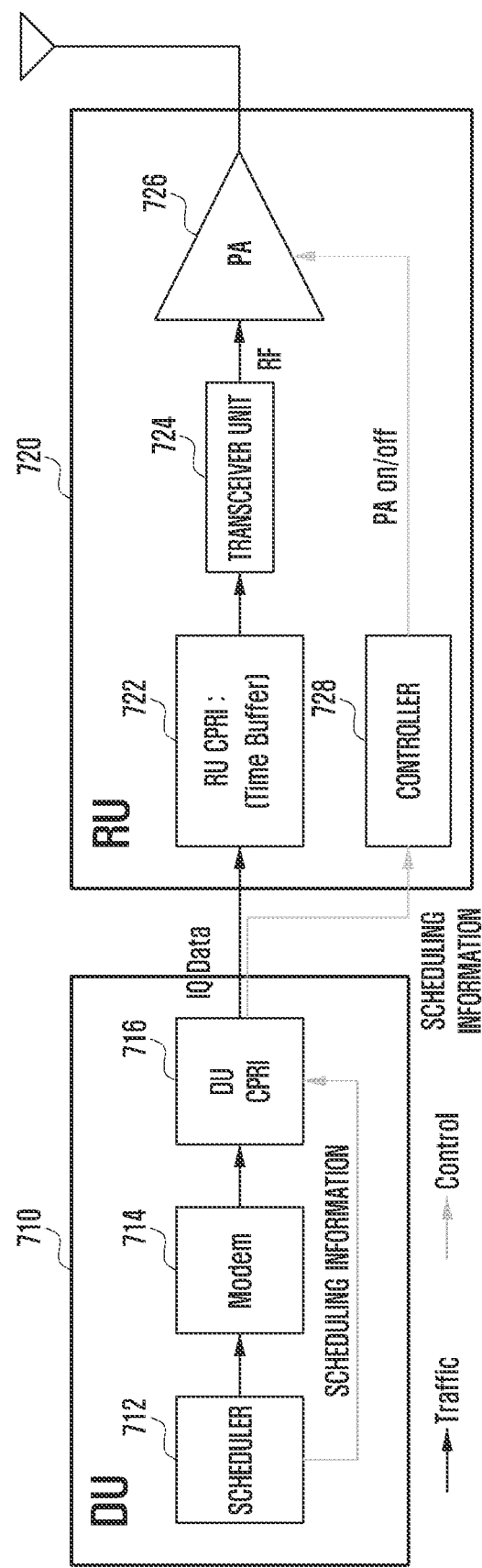
FIG. 7 is a schematic diagram showing a transmitter for controlling transmission power by exchanging information between a digital unit (DU) and a radio unit (RU), according to an embodiment of the present disclosure.

FIG. 7 is a schematic diagram showing a transmitter for controlling transmission power by exchanging information between a DU and an RU, according to an embodiment of the present disclosure.

Referring to FIG. 7, the transmitter of the embodiment may include a DU 710 and an RU 720.

The DU 710 may create a signal that will be transmitted by the transmitter. More specifically, the DU 710 may include at least one of the following: a scheduler 712, a modem 714, and a DU common public radio interface (DU CPRI) 716.

The scheduler 712 may determine whether to allocate user data traffic to be transmitted to UE. In addition, according to an embodiment, the scheduler 712 may determine a control channel symbol region to which the control information is transmitted, and may also transmit the related information to the DU CPRI 716. Transmission signals may be determined according to information determined or judged by the scheduler 712.

The modem 714 may processes the scheduled user data traffic, signals to be transmitted to a plurality of physical control channels, and physical signals transmitting information.

The DU CPRI 716 may convert the signals from the modem 714 into I/Q signals in the CPRI format, and transfer the converted I/Q signals, along with the information received from the scheduler 712, to the RU 720. The DU CPRI 716 may transfer signals in a subframe unit to the RU 720.

The RU 720 may amplify signals received from the DU 710 so that the signals can be transmitted through a wireless channel. The RU 720 of the embodiment may include an RU CPRI 722, a transceiver unit 724, a PA 726, and a controller 728.

The RU CPRI 722 may receive the I/Q signal, process the signal or data, and perform the time buffering. The RU CPRI 722 may transfer the processed I/Q signal to the transceiver unit 724.

The transceiver unit 724 may convert the received I/Q signal into radio frequency (RF) signals and may transfer the RF signals to the PA 726.

The PA 726 may amplify the amplitude of the analog RF signals and may transmit the amplified signals to the receiver through a wireless channel.

The controller 728 may control the operations of the RU 720. The controller 728 may control power supplied to the PA 726 based on the received scheduling information. The received, scheduling information may include information about a pattern of transmission signals. More specifically, in the LTE system, the scheduling information received by the controller 728 may include traffic pattern information. The traffic patterns may be determined to differ from each other according to types of transmission signals. The traffic pattern may be designated by a particular indicator.

According to an embodiment of the present disclosure, the traffic pattern information to be transmitted may be indicated by a 2-bit indicator. The traffic patterns indicated by the 2-bit indicator may be as follows:

traffic pattern 01: when user traffic has not been allocated during the subframe and the control channel symbol region has symbols less than or equal to two;

traffic pattern 11: when user traffic has not been allocated during the subframe and control channel symbol region has symbols less than or equal to three; and traffic pattern 00: when subframe is allocated user traffic (user traffic including PDSCH by system information block (SIB)).

The controller 728 may control transmission power according to the received patterns described above.

The controller 728 may also determine transmission power of the PA based on the received scheduling information, the current subframe pattern, and the cell-related information (e.g., LTE bandwidth, CRS information, etc.), etc. The controller 728 may control the transmission power by adjusting the drain bias voltage of the PA.

It should be understood that the controller 728 controls the PA 726, e.g., turning on/off, controlling/adjusting the PA drain bias voltage, etc.

In the embodiment, the transfer of a command for controlling the drain bias voltage from the controller 728 to the PA 726 may be less than 1 μs, and the drain bias of the PA 726 in response to the transferred command may be varied 5~7 μs.

Figure 8:
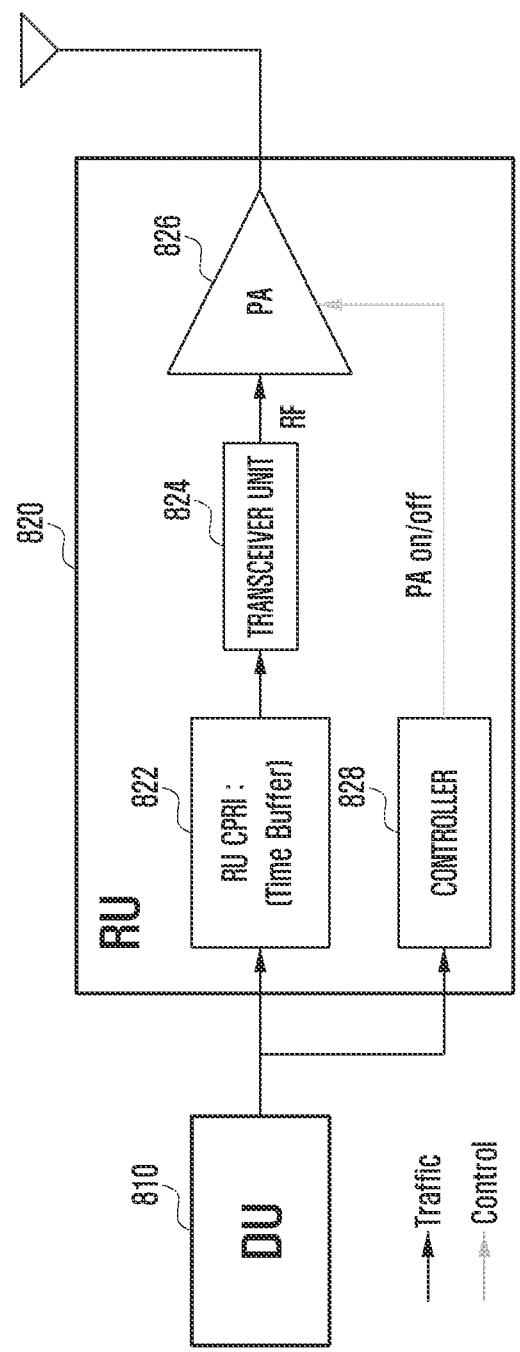
FIG. 8 is a schematic diagram showing a transmitter with a RU, for performing power control based on signals received from a DU, according to an embodiment of the present disclosure.

FIG. 8 is a schematic diagram showing a transmitter with an RU, for performing power control based on signals received from a DU, according to an embodiment of the present disclosure.

Referring to FIG. 8, the transmitter of the embodiment may include a DU 810 and an RU 820.

The DU 810 may create signals that the transmitter will transmit. The DU 810 may convert the created signals into I/Q signals, and transfer the I/Q signals to the RU 820.

The RU 820 may perform conversion and amplification for the signals received from the DU 810 to transmit the processed signal through a wireless channel. The RU 820 may include an RU CPRI 822, a transceiver unit 824, a PA 826, and a controller 828.

The RU CPRI 822 may receive the I/Q signal, process the signal or data, and perform the time buffering. The RU CPRI 822 may transfer the processed I/Q signal to the transceiver unit 824.

The transceiver unit 824 may convert the received I/Q signal into RF signals and may transfer the RF signals to the PA 826.

The PA 826 may amplify the amplitude of the analog RF signals and may transmit the amplified signals to the receiver through a wireless channel.

The controller 828 may: control the operations of the RU 820; monitor the received I/Q signals for a period of time to determine whether user data traffic is allocated; and control the PA 826 based on a condition as to whether user data traffic has been allocated.

In an LTE system according to an embodiment, when I/Q data does not exist (or I/Q data is '0') at the start point of the third or fourth symbol in an LTE subframe, for a certain period of time (Tw_d), the controller 828 ascertains that the subframe does not have user traffic. When I/Q data exists (or I/Q data is not '0'), the controller 828 ascertains that the subframe has user traffic. In another embodiment, the controller 828 may monitor a particular point in the received signal to control power based on the monitoring. PDSCH as user traffic can be allocated to the fourth symbol, regardless of PCFICH values, after Rel-12. In this case, the controller 828 may monitor the fourth symbol to determine whether user traffic exists.

When the controller 828 ascertains that user traffic does not exist, it may determine the minimum PA drain bias voltage, based on the current subframe pattern and cell-related information (e.g., LTE bandwidth and CRS-related information), and may control the drain bias of the PA 826.

The controller 828 may control the PA drain bias so that the PA drain bias level is the original state before the first symbol of the next subframe is transmitted from the PA.

In the embodiment, the time that the controller 828 monitors the I/Q signal may be 10~30 μs; the transfer of a command for controlling the drain bias voltage from the controller 828 to the PA 826 may be less than 1 μs; and the drain bias transient time of the PA 826 may be 40~60 μs.

As describe above, the controller monitors the I/Q signal, determines whether user data is allocated based on the monitoring, and controls power supplied to the PA 826 based on the determination, thereby simply controlling power.

Figure 9:
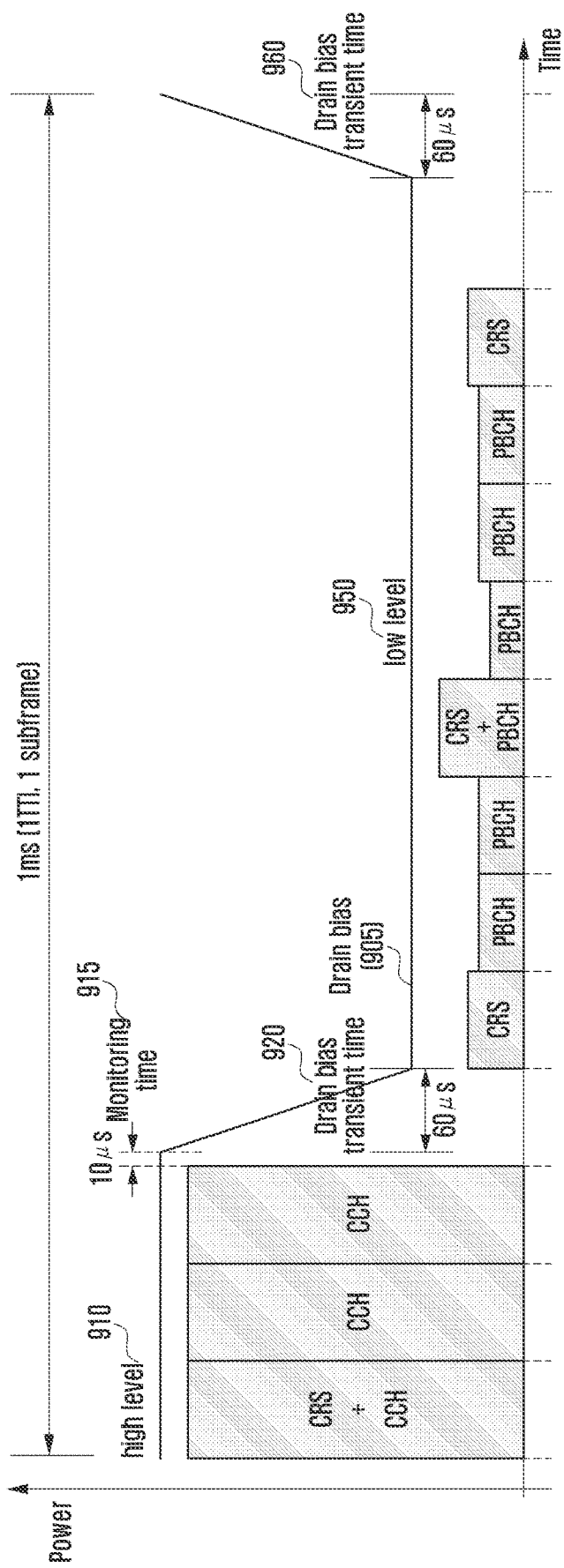
FIG. 9 is a timing chart showing the variation of transmission power that is controlled as time elapses (depending on time), according to an embodiment of the present disclosure.

FIG. 9 is a timing chart showing the variation of transmission power that is controlled as time elapses (i.e., depending on time), according to an embodiment of the present disclosure.

Referring to FIG. 9, signals transmitted in a particular subframe and the drain bias level controlled according to the signals are shown. The subframe shown in FIG. 9 is an example when signals related to user data are not transmitted. A transmission signal may include at least one of the following: CRS, CCH, and PBCH.

The controller of the transmitter may monitor I/Q signals and may adjust drain bias levels according to the monitored results. In the embodiment, the controller monitors I/Q signals up to a particular period of time (a particular point) of the fourth symbol. When a transmission signal does not exist, the controller ascertains that user data has not been allocated to a corresponding subframe, and may adjust the drain bias level. The adjusted value may a preset value or may be set according to a subframe pattern that the controller has determined based on the I/Q signal.

In the embodiment, the monitoring interval (time) 915 is an interval (time) of 1 μs of the fourth subframe. When transmission of data is not performed during the monitoring interval (time) 915, the drain bias 905 may be changed from high level 910 to low level 950. The drain bias may return to from the low level 950 to the high level 910 before the next subframe. In this case, train bias transient times 920 and 960 may be created due to the characteristics of device.

According to various embodiments of the present disclosure, the method can control transmission power according to a condition as to whether a transmitter of a wireless communication system performs transmission of user data, thereby increasing the efficiency of power consumption. The transmitter is adapted to the method. In addition, embodiments of the present disclosure can control power values for controlling transmission power and the timing to control the transmission power, thereby minimizing the aging of transmission performance and also reducing the waste of electric power.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a transmitter in a mobile communication system, the method comprising:
   identifying at least one signal to be transmitted on a subframe;
   determining a first bias level of a power amplifier (PA) of the transmitter, in case that user data is included in the at least one signal based on the identification;
   determining a second bias level of the PA based on a type of the at least one signal, in case that the user data is not included in the at least one signal based on the identification; and
   transmitting, to a receiver, the at least one signal on the subframe, based on the first bias level or the second bias level of the PA,
   wherein the second bias level is lower than the first bias level, and
   wherein the type of the at least one signal includes at least one of a reference signal, a synchronization signal, control information, and a signal for transmitting cell information.

2. The method of claim 1, wherein the identifying the at least one signal to be transmitted on the subframe further comprises:
identifying scheduling information corresponding to the subframe; and
identifying whether the at least one signal includes the user data based on the identified scheduling information.

3. The method of claim 1, wherein the identifying the at least one signal to be transmitted on the subframe further comprises:
identifying the type of the at least one signal, in case that the at least one signal does not include the user data.

4. The method of claim 1, wherein the identifying the at least one signal to be transmitted on the subframe further comprises:
monitoring an interval of the at least one signal to be transmitted on the subframe; and
identifying whether the at least one signal includes the user data based on a result of the monitoring.

5. The method of claim 1, wherein the transmitting the at least one signal further comprises:
controlling the drain bias of the power amplifier of the transmitter based on the first bias level or the second bias level for the subframe.

6. The method of claim 1, wherein the determining the second bias level further comprises:
determining transmission power for the subframe based on at least one of cell information related to the at least one signal, or control information related to the at least one signal; and
determining the second bias level based on the determined transmission power.

7. The method of claim 1, wherein transmission power for the subframe according to the first bias level or the second bias level is selected among predetermined candidate power values, based on the identification.

8. The method of claim 2, wherein the scheduling information includes information of whether the user data is included in the at least one signal or information of whether control information is included in the at least one signal.

9. A transmitter of a mobile communication system, the transmitter comprising:
a transceiver configured to transmit and receive a signal; and
at least one processor coupled with the transceiver and configured to:
identify at least one signal to be transmitted on a subframe;
determine a first bias level of a power amplifier (PA) of the transmitter, in case that user data is included in the at least one signal based on the identification;
determine a second bias level of the PA based on a type of the at least one signal, in case that the user data is not included in the at least one signal based on the identification; and
control the transceiver to transmit, to a receiver, the at least one signal on the subframe, based on the first bias level or the second bias level of the PA,
wherein the second bias level is lower than the first bias level, and
wherein the type of the at least one signal includes at least one of a reference signal, a synchronization signal, control information, and a signal for transmitting cell information.

10. The transmitter of claim 9, wherein the at least one processor is further configured to:
identify scheduling information corresponding to the subframe, and
identify whether the at least one signal includes the user data based on the identified scheduling information.

11. The transmitter of claim 9, wherein the at least one processor is further configured to identify the type of the at least one signal, in case that the at least one signal does not include the user data.

12. The transmitter of claim 9, wherein the at least one processor is further configured to:
monitor an interval of the at least one signal to be transmitted on the subframe, and
identify whether the at least one signal includes the user data based on a result of the monitoring.

13. The transmitter of claim 9, wherein the at least one processor is further configured to control the drain bias of the power amplifier of the transmitter based on the first bias level or the second bias level for the subframe.

14. The transmitter of claim 9, wherein the at least one processor is further configured to determine transmission power for the subframe based on at least one of cell information related to the at least one signal, or control information related to the at least one signal, and determine the second bias level based on the determined transmission power.

15. The transmitter of claim 9, wherein the at least one processor is further configured to select transmission power for the subframe according to the first bias level or the second bias level among predetermined candidate power values, based on the identification.

16. The transmitter of claim 10, wherein the scheduling information includes information of whether the user data is included in the at least one signal or information of whether control information is included in the at least one signal.

* * * * *